United States Patent [19]

Müller

[11] Patent Number: 4,578,197

[45] **Date of Patent: * Mar. 25, 1986**

[54] METHOD OF AND FILTER THICKENER FOR THICKENING OF SUSPENSIONS

[75] Inventor: Hans Müller, Erlenbach, Switzerland

[73] Assignee: DrM Dr. Müller AG, Männedorf, Switzerland

[ * ] Notice: The portion of the term of this patent subsequent to Mar. 27, 2001 has been disclaimed.

[21] Appl. No.: 401,322

[22] Filed: Jul. 23, 1982

[30] Foreign Application Priority Data

Aug. 4, 1981 [CH] Switzerland ........................ 5015/81
Oct. 5, 1981 [CH] Switzerland ........................ 6375/81

[51] Int. Cl.[4] ............................................ B01D 35/12
[52] U.S. Cl. .................................. 210/772; 210/108; 210/333.1
[58] Field of Search ............... 210/767, 791, 768, 772, 210/778, 193, 115, 104, 108, 106, 333.1

[56] References Cited

U.S. PATENT DOCUMENTS

| | | | |
|---|---|---|---|
| 2,661,244 | 12/1953 | Baily | 210/193 X |
| 2,862,622 | 12/1958 | Kircher, Jr. et al. | 210/410 X |
| 3,891,551 | 6/1975 | Tiedemann | 210/410 X |
| 4,439,327 | 3/1984 | Muller | 210/108 X |

FOREIGN PATENT DOCUMENTS

| | | | |
|---|---|---|---|
| 211329 | 10/1960 | Austria | 210/333.01 |
| 2741639 | 4/1978 | Fed. Rep. of Germany | 210/333.01 |

*Primary Examiner*—Frank Spear
*Attorney, Agent, or Firm*—Michael J. Striker

[57] ABSTRACT

A method of and an arrangement for thickening of suspensions includes filtering of a suspension through candlelike filter elements in a filter container, backwashing the filter elements individually without interrupting the filtration process by applying pressure impulses of gaseous backwash medium to the pressure elements in a direction opposite to the filtration direction, wherein the gaseous backwash medium forms a gas chamber over the filter elements separated from the suspension fluid and having an adjustable pressure.

32 Claims, 4 Drawing Figures

METHOD OF AND FILTER THICKENER FOR THICKENING OF SUSPENSIONS

BACKGROUND OF THE INVENTION

The present invention relates to a method of and an arrangement for continuously thickening of suspensions in a filter thickener with candle-shaped filter elements mounted on individually removable collecting pipes.

Filter thickeners of the above-mentioned general type are known in the art. One of such filter thickeners is described, for example, in the German Offenlegungsschrift No. 2,741,639 and has a filter container in which collecting pipes with filter elements suspended therefrom one behind the other are mounted. The collecting pipes lie near one another on supporting members and can be removed from the filter container in rows. A device for backwashing of filter candles arranged in rows in standing position is disclosed in the Austrian Pat. No. 211,329. Line conduits on which the filter elements are mounted extend horizontally at both sides through the wall of the container. This extension at both sides is very expensive to manufacture and thereby cost consuming. In addition to the great number of the reservoir openings, each line conduit is provided with two check valves which require a great number of valves and fittings. In all methods of this art for thickening of suspensions with a filter thickener, after filtration cycle in the event of depositing (alluvium) with filter aid means, the filter aid means must be supplied via a supply conduit.

SUMMARY OF THE INVENTION

Accordingly, it is an object of the present invention to provide a method of and an arrangement for thickening of suspensions, which avoid the disadvantages of the prior art.

More particularly, it is an object of the present invention to provide a method of and an arrangement for thickening of suspensions, which make possible a continuous thickening of suspensions with the aid of a filter thickener.

Still another feature of the present invention is to provide a method of and an arrangement for thickening of suspensions, which allows thickening without or with minimum addition of filter aid means.

In keeping with these objects and with others which will become apparent hereinafter, one feature of the present invention resides, briefly stated, in a method of continuous thickening of suspensions, in which a gaseous backwash medium which is used for backwashing filter elements forms over the filter elements a gas chamber which is separated from the suspension fluid and has an adjustable pressure.

Still another feature of the present invention is an arrangement for continuous thickening of suspensions, in which means are provided for forming over the filter element a gas chamber for the gaseous backwash medium so that the gas chamber is separated from a suspension fluid and has an adjustable pressure.

When the method is performed and the arrangement is designed in accordance with the present invention, they eliminate the above-mentioned disadvantages of the prior art and attain the above-mentioned objects.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figures 1, 3:
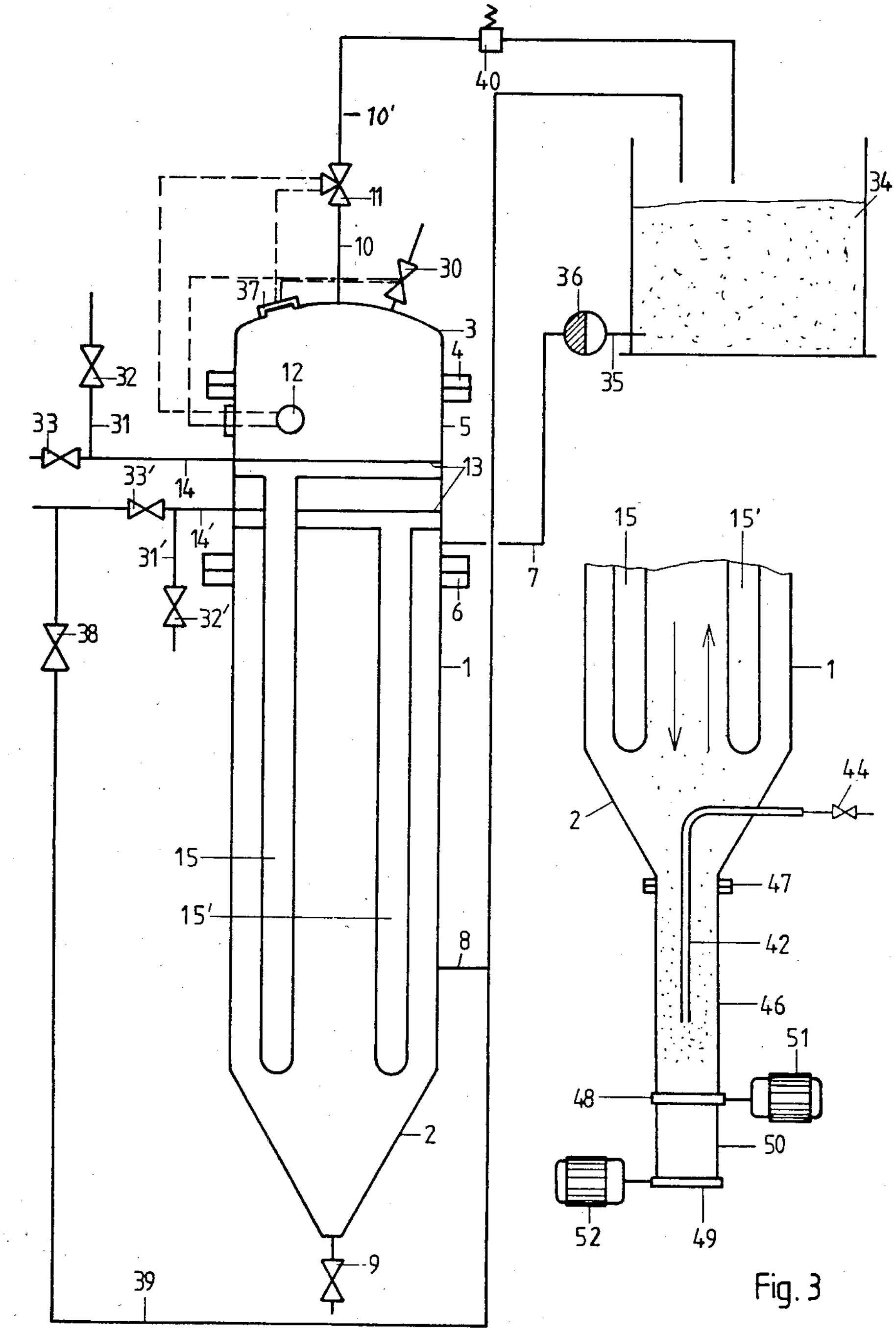
FIG. 1 is a view schematically showing a filter thickener in accordance with the present invention.
FIG. 3 is a view showing a lower part of a filter thickener in accordance with a further embodiment of the present invention with a cleaning device.

A thickening filter shown in FIG. 1 has a filter container with a cylindrical part 1 having a conical bottom 2, and a cover 3. The cover 3 is connected by a pair of flanges 4 with a cylindrical intermediate part 5. The latter is connected by a pair of flanges 6 with the cylindrical part 1.

The cylindrical part 1 has in its cylindrical portion a supply conduit 7 for a pulp and a withdrawal conduit 8 for a return flow. A valve 9 serves as a mud discharge. A gas conduit 10 with a control valve 11 is provided in the dome-shaped convex cover 3. A conduit 10' leads to a high-pressure valve 40 which is fed by a not-shown pressure gas source. A level regulating element 12 is further provided in the upper part of the arrangement.

Collecting pipes with their conduits 14 and 14' are mounted on a circular ring 13. Only two conduits are shown in the drawings for the sake of simplification. The number of the collecting pipes can be selected in correspondence with the dimensions of the arrangement and the required filtering surface. Filter elements 15 and 15' are mounted on the collecting pipes.

Each of the conduits 14 and 14' has a gas backwash conduit 31 and 31' having valves 32 and 32', respectively. Valves 33 and 33' serve for locking the filtrate conduits 14 and 14'. A tank 34 serves for receiving the pulp and is connected via a conduit 35 with a pump 36 leading to the conduit 7.

Figure 2:
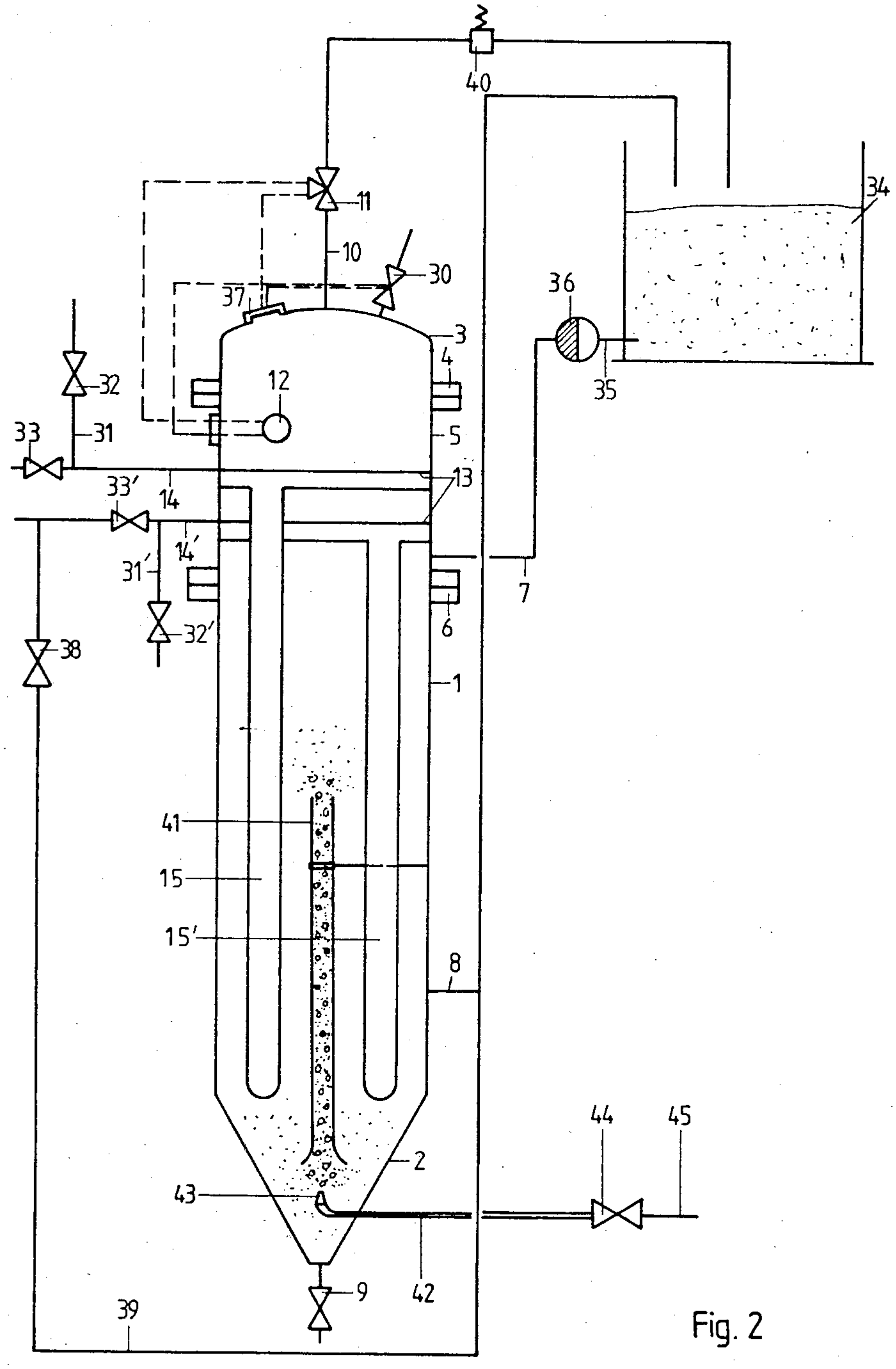
FIG. 2 is a view substantially corresponding to the view of FIG. 1 but showing a filter thickener in accordance with another embodiment of the present invention with a riser pipe.

In the arrangement shown in FIG. 2 a riser pipe 41 is additionally provided. It starts substantially in the center of the conical bottom 2 and is mounted between the filter elements 15 and 15'. A pressure conduit 42 leads to the riser pipe 41, and a nozzle 43 can be provided at its end. The pressure conduit 42 has a valve 44 which is connected via a supply conduit 45 with a not-shown pressure gas or pressure liquid source.

In the arrangement shown in FIG. 3 the conical bottom 2 has an extension formed by a tube 46 connected with the bottom by flange 47. A pressure conduit 42 extends through the tube 46 downwardly. Shutters 48 and 49 are provided in the tube 46. A sluice 50 is formed between the shutters 48 and 49. The shutter 48 is actuated by an electric motor 51, whereas the shutter 49 is actuated by an electric motor 52.

Figure 4:
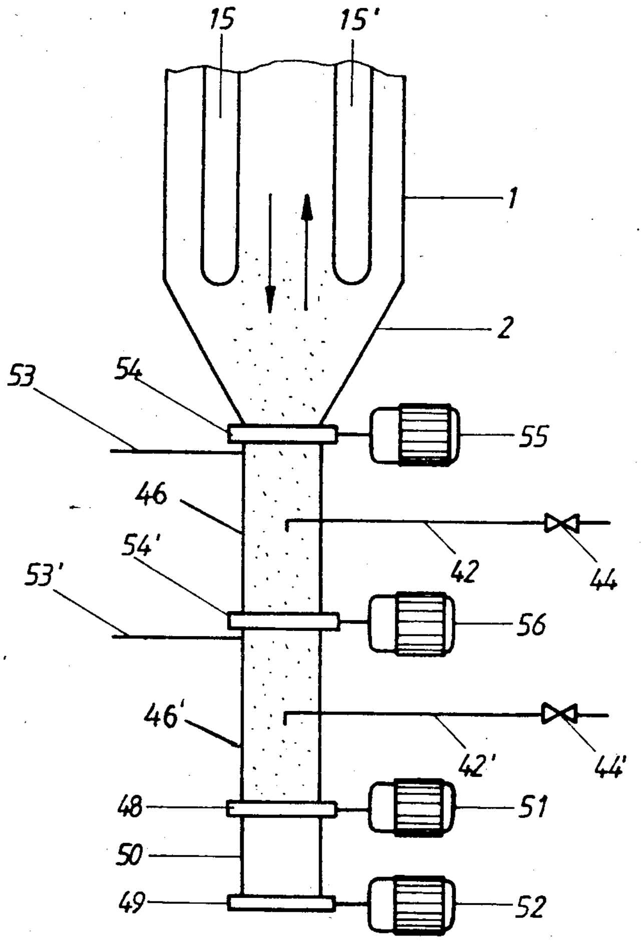
FIG. 4 is a view substantially corresponding to the view of FIG. 3, but showing still a further embodiment of the invention.

In the arrangement of FIG. 4, a further tube 46' is provided between the sluice 50 and the tube 46. The tubes 46 and 46' can be closed by shutters 54, 54' and 48.

The shutters 54 and 54′ are actuated by electric motors 55 and 56. Washing conduits 42 and 42′ and venting conduits 53 and 53′ lead to the tubes 46 and 46′, respectively.

The inventive method is performed and the inventive arrangement operates in the following manner: A pulp is supplied via the supply conduit 7 into the cylindrical part 1. The solid matter deposits on filtering fabric of the perforated filter elements 15 and forms there a solid matter cake. The liquid released from the solid matter flows via the collecting pipes and their conduits 14 as a filtrate out of the container. The upper part of the container contains an air reserve of approximately 1/6–¼ of the total volume of the filter container 1. The fluid level in the container is maintained constant with the aid of the level regulating element 12. When the fluid level in the container lowers, for example during backwashing with air, a venting valve 11 opens so that the desired level is again attained. When the fluid level rises in the container, a pressure air valve 30 which is controlled via the level regulating elements 12 opens. When the gas pressure in the cover 3 increases, for example, over 2 bar, the valve 11 also opens and releases gas to the desired nominal value.

During the process of filtration proper, a pulp is supplied from the tank 34 by the pump 36 via the supply conduit 7 into the container. It is filtered at constant pressure. The valves 33 and 33′ are open, whereas the valves 32 and 32′ are closed. In the chamber above the filter elements 15 a gas pressure of 2 bar takes place. For cleaning, for example, of a segment connected with the conduit 14, the valve 33 is automatically closed and the valve 32 connected with a pressure source of for example 3 bar is opened, without interrupting the filtration in other segments. Pressure air or another pressure gas passes through the conduit 14 and releases the filter element of the entire segment. The level regulating element 12 opens to release the inflowing air. Via a pressure transmitter 37 and the valve 30 the pressure is again adjusted to the filtration pressure of 2 bar.

After termination of cleaning, the valve 32 is closed and the valve 33 is open. In an analogous manner the next row of the filter elements is cleaned. If necessary, the individual segments are cleaned after one another. In the event of danger of a pulp flow, the filtrate can be returned back to the tank 34 in short time, by opening of the valve 38 arranged in a return conduit 39. The depositing with filter aid means can be performed via the supply conduit 7.

In accordance with the advantageous embodiment of FIG. 2, the thickened residue is applied on the filter element 15 with the aid of an air-lift pump composed of the riser pipe 41, and gas supplied via the pressure conduit 42. A compressed gas, for example air or a fluid, for example suspension in question can be used as a pressure medium.

In the embodiment of FIG. 3 the thickened residue can be treated again in the tube 46 by pressure gas or cleaning liquid supplied via the conduit 42. The residue is thereby subjected to whirling and therefore cleaned. After opening of the shutter 48, it is settled on the shutter 49. By closing of the shutter 48 and opening of the shutter 49, the cleaned residue accumulated in the sluice 50 is discharged.

In the construction of FIG. 4, the solid matter from the filter elements deposits in the tube 46 in condition of the open shutter 54 and the closed shutter 54′. For washing off the deposit, the washing fluid is supplied via the washing conduit and whirles the solid matter. After settling, the shutter 54 is closed and the contents is supplied from the tube 46 by opening of the shutter 54′ into the tube 46′ with open venting through the conduit 53. Here a further washing takes place via the conduit 42′, and the washing liquid displaces upwardly in the tube 46. By opening of the shutter 48, the solid matter advances in the sluice and is discharged from the latter as described hereinabove. This cycle can now be repeated, whereas the supplied washing liquid can again displace upwardly and leave the system through the filter elements.

The entire operation is controlled with the aid of a control device, and several possibilities can be provided: It can be controlled upon the time in accordance with the experience. The control can be performed upon the filtration speed, i.e. in the event of a smaller flow the backwashing is automatically actuated. The control can be performed upon the return flow with the aid of pulp measurements. The control can be performed upon the discharge of the concentrate by the discharge valve 9 and a timer or mud concentration measurement. The control can be performed upon an excess pressure valve 40 which serves for maintaining a minimum pressure in the head part of the container. The shutters 48 and 49 above and below the sluice 50 can be controlled in a predetermined cycle.

During a fast cycle of cleaning and putting again the filter elements into operation no filter aid means is required in many cases. Thus the inventive method and arrangement is proven to be especially suitable for purification of salt water before and after the electrolysis. It can also be utilized for releasing red pulp from caustic soda, filtration of viscous from spinning baths, separation of condensate, filtration of PVC waste water and filtration of thin juice in sugar industry with excellent results.

It will be understood that each of the elements described above, or two or more together, may also find a useful application in other types of constructions differing from the types described above.

While the invention has been illustrated and described as embodied in a method of and an arrangement for thickening of suspensions, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of the present invention.

What is claimed as new and desired to be protected by Letters Patent is set forth in the appended claims:

1. A method of continuously thickening of suspensions in a filter thickener having a plurality of candle-like filter elements arranged in a container on individual collecting pipes, comprising the steps of thickening a suspension by filtering the same through filter elements in a filtration direction and withdrawing a thickened matter;

backwashing the filter elements without individually interrupting the filtration and by applying to the filter elements pressure impulses of gaseous backwash medium in a direction which is opposite to the filtration direction;

forming over the filter elements by the gaseous backwash medium a gas chamber separated from a suspension fluid and having an adjustable pressure; and adjusting a gas pressure in the gas chamber so as to maintain a constant level of fluid in the container.

2. A method as defined in claim 1, wherein said adjusting step includes venting gas from the gas chamber, and maintaining a constant level of fluid by a fluid level regulator acting upon the gas venting from the gas chamber.

3. A method as defined in claim 1, wherein said gas adjusting step includes adjusting the pressure in the gas chamber via an exhaust valve.

4. A method as defined in claim 1, wherein said adjusting step includes venting gas from the gas chamber via a gas venting conduit and arranging an excess-pressure valve in the venting conduit.

5. A method as defined in claim 1, wherein said adjusting step includes supplying the gas chamber with a pressure gas via an additional valve.

6. A method as defined in claim 1; and further comprising the step of automatically adjustably controlling the time of filtration and the time of backwashing.

7. A method as defined in claim 1; and further comprising the steps of supplying the suspension from a supply tank, withdrawing a clarifate via a clarifate conduit, and returning the clarifate during and shortly after a filtering cycle to the supply tank via a further valve arranged in the clarifate conduit.

8. A method as defined in claim 1; and further comprising the step of withdrawing the thickened matter from below the filter elements out of the container via a controlled valve.

9. A method as defined in claim 1; and further comprising the step of returning a part of the thickened matter, prior to beginning of a filtration cycle, for depositing as filtering aids.

10. A method as defined in claim 9, wherein said returning step includes returning the thickened matter with the aid of a pump into a filtrate chamber and again depositing as filtering aids on the filter elements.

11. A method as defined in claim 10, wherein said returning step includes returning the thickened matter in the filtrate chamber with the aid of a gas-lift pump.

12. A method as defined in claim 11, wherein the container has a bottom with two tubular parts arranged successively after one another, said returning step including supplying a washing fluid alternately into the tubes, whirling the washed thickened matter, settling the latter and thereafter advancing a solid matter downwardly and the washing fluid upwardly.

13. A method as defined in claim 9, wherein said returning step includes returning the thickened matter in the filtrate chamber by a gas driving stream.

14. A method as defined in claim 9, wherein said returning step includes returning the thickened matter in the filtrate chamber by a liquid stream.

15. A method as defined in claim 9, wherein the container has a bottom with a tubular part therebelow, said returning step including cleaning the thickened matter in the tubular part by whirling.

16. A method as defined in claim 15, wherein said returning step also includes settling of the thickened matter; and further comprising the step of discharging the cleaned and settled thickened matter via a sluice.

17. A filter thickener for continuously thickening of suspensions, comprising a container;

a plurality of collecting pipes;

a plurality of candle-like filtering elements arranged in said container on said collecting pipes and operative for thickening a suspension by filtering the same through said filter elements in a filtration direction and withdrawing a thickened matter;

means for backwashing said filter elements without interrupting the filtration and individually by applying to said filter elements pressure impulses of gaseous backwash medium in a direction which is opposite to the filtration direction;

means forming over the filter elements by the gaseous backwash medium a gas chamber separated from a suspension fluid and having an adjustable pressure; and means for adjusting a gas pressure in said gas chamber so as to maintain a constant level of fluid in said container.

18. A filter thickener as defined in claim 17, wherein said adjusting means includes means for venting gas from the gas chamber, and means for maintaining a constant level of fluid including a fluid level regulator acting upon said gas venting means.

19. A filter thickener as defined in claim 17, wherein said adjusting means includes an exhaust valve for adjusting the pressure in said gas chamber.

20. A filter thickener as defined in claim 17, wherein said adjusting means includes a gas venting conduit for venting gas from said gas chamber and an excess-pressure valve arranged in said gas conduit.

21. A filter thickener as defined in claim 17, wherein said adjusting means includes an additional valve for supplying said gas chamber with a pressure gas.

22. A further thickener as defined in claim 17; and further comprising means for automatically adjustably controlling the time of filtration and the time of backwashing.

23. A filter thickener as defined in claim 17; and further comprising a supply tank for supplying the suspension, a clarifiate conduit for withdrawing a clarifate, and means for returning the clarifate during and shortly after a filtering cycle to said supply tank and including a further valve arranged in said clarifate conduit.

24. A further thickener as defined in claim 17; and further comprising means for withdrawing the thickened matter from below said filter elements out of said container and including a controlled valve.

25. A further thickener as defined in claim 17; and further comprising means for returning a part of the thickened matter, prior to beginning of a filtration cycle, for depositing as filtering aids.

26. A filter thickener as defined in claim 25, wherein said returning means includes a pump operative for returning the thickened matter into a filtrate chamber and again depositing the same as filtering aids on said filter elements.

27. A filter thickener as defined in claim 26, wherein said pump of said returning means is formed as a gaslift pump.

28. A filter thickener as defined in claim 25, wherein said returning means includes means for returning the thickened matter in said filtrate chamber by a gas driving stream.

29. A filter thickener as defined in claim 25, wherein said returning means includes means for returning the thickened matter in said filtrate chamber by a liquid stream.

30. A filter thickener defined in claim 25, wherein said container has a bottom with a tubular part therebelow, said returning means including means for cleaning the thickened matter in said tubular part by whirling.

31. A filter thickener as defined in claim 30, wherein said returning means also includes means for settling of the thickened matter; and further comprising a sluice for discharging the cleaned and settled thickened matter therethrough.

32. A filter thickener as defined in claim 25, wherein the container has a bottom with two tubular parts successively arranged therebelow, said returning means including means for alternately supplying a washing fluid into said tubes, whirling the thickened matter in said tubes, and after settling, advancing a solid matter downwardly and the washing liquid upwardly.

* * * * *